United States Patent [19]

Karlen

[11] 3,754,686

[45] Aug. 28, 1973

[54] COFFEE DISPENSER

[75] Inventor: Harvey R. Karlen, Chicago, Ill.

[73] Assignee: Cory Corporation, Chicago, Ill.

[22] Filed: Feb. 9, 1971

[21] Appl. No.: 113,996

[52] U.S. Cl. ................ 222/238, 222/311, 222/363
[51] Int. Cl. .......................................... G01f 11/20
[58] Field of Search .................... 222/238, 311, 312, 222/313, 317, 355, 368, 299, 300, 303, 362, 363, 367, 506

[56] References Cited
UNITED STATES PATENTS

| 3,606,965 | 9/1971 | Cortelyou et al. | 222/368 X |
|---|---|---|---|
| 2,268,725 | 1/1942 | Steel | 222/368 X |
| 1,294,187 | 2/1919 | Stener et al. | 222/238 X |
| 2,321,869 | 6/1943 | Stanyer | 222/363 X |
| 2,552,093 | 5/1951 | Gollbach et al. | 222/312 |
| 2,779,512 | 1/1957 | Steele et al. | 222/363 X |
| 3,086,684 | 4/1963 | Flaaerty | 222/506 X |

*Primary Examiner*—Robert B. Reeves
*Assistant Examiner*—Larry Martin
*Attorney*—Hofgren, Wegner, Allen, Stellman & McCord

[57] ABSTRACT

A dispenser for dispensing particulate material, such as coffee, in any one of a number of different preselected quantities. The dispenser includes means for delivering the coffee past a preselected group of blocking elements controlling the filling of a corresponding plurality of receptacles. The receptacles are movably mounted for delivery of the ground coffee therefrom when desired. The dispenser further includes agitating means for improved delivery of the ground coffee, with means for effecting operation of the agitating means automatically as an incident of operation of the dispenser delivery means.

17 Claims, 9 Drawing Figures

Patented Aug. 28, 1973

Inventor:-
Harvey R. Karlen
By Hofgren, Wegner, Allen, Stellman & McCord Attys.

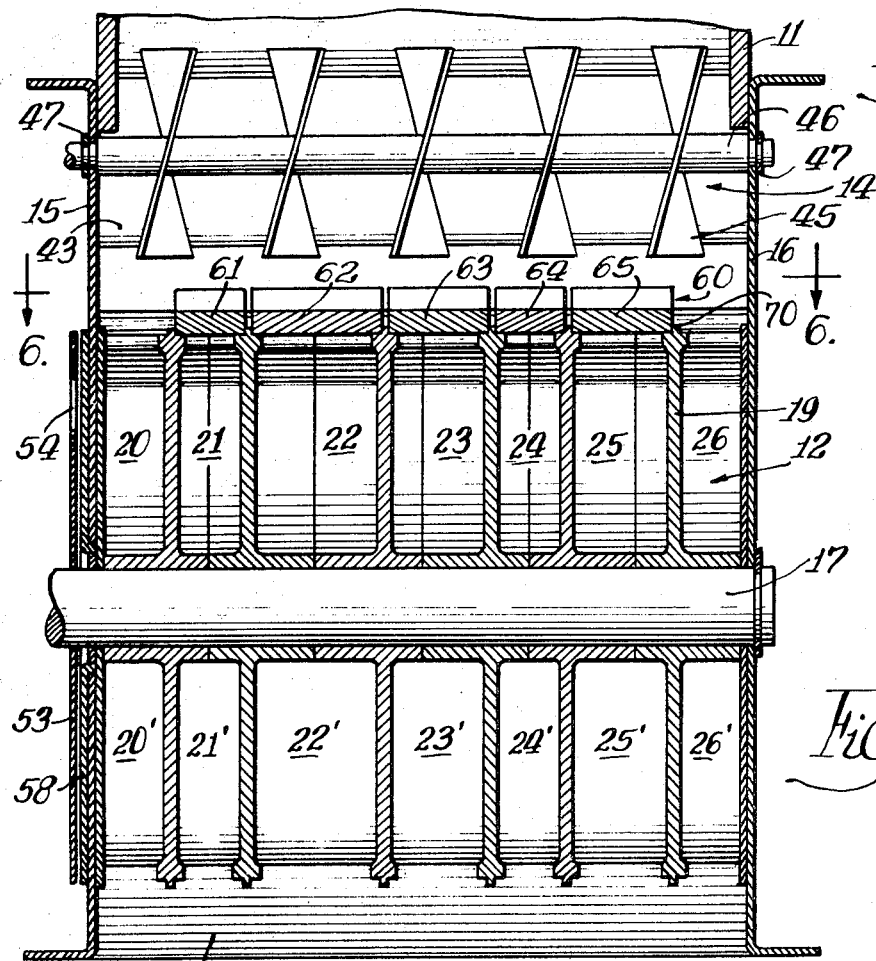
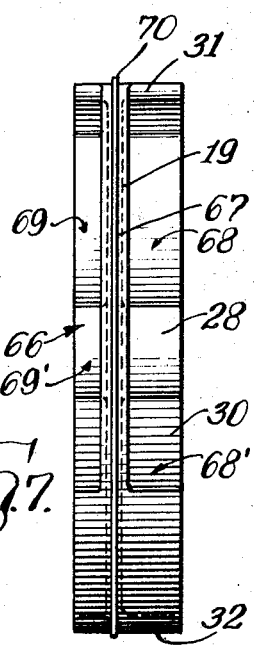
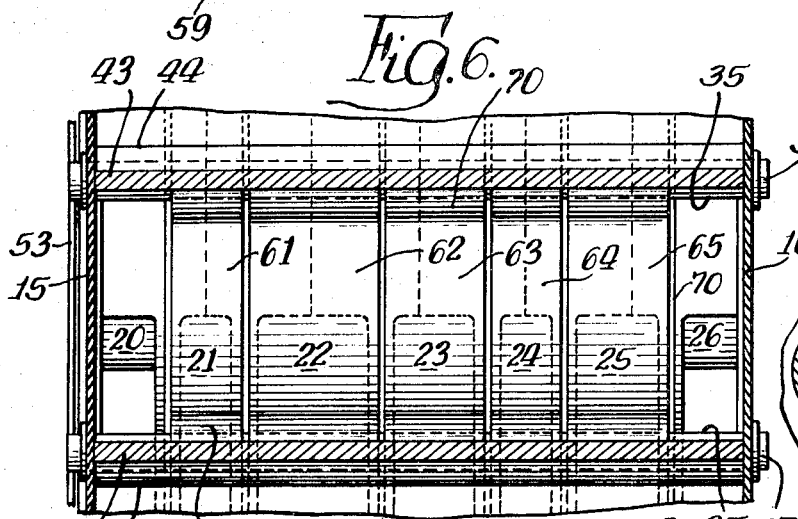
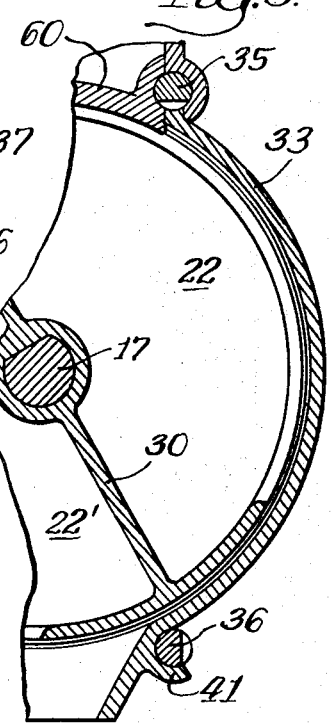

COFFEE DISPENSER

BACKGROUND OF THE INVENTION

1. Field of the Invention

This invention relates to dispensers for dispensing preselected quantities of material and in particular to dispensers for delivering particulate material, such as ground coffee.

2. Description of the Prior Art

In restaurants and the like, where substantial quantities of beverages, such as coffee, are constantly being prepared, it is desirable to provide means for delivering preselected, accurately measured quantities of the beverage charge for use in the large brewing apparatuses. At times, the personnel are substantially rushed so that the means for dispensing the beverage charge must preferably be fully automatic while yet assuring highly accurate measurement with effectively minimum manipulation.

Further, because of varying capacities of different brewing apparatuses, it is desirable that the beverage charge measuring means be readily adjustable to provide any one of a plurality of different preselected quantities thereof. Thus, illustratively, where the beverage ingredient comprises ground coffee, it is desirable to provide any one of preselected quantities of the ingredient in the range of 1 to 4-½ ounces.

Further, where the particulate, or pulverulent, material tends to bridge in the hopper portion of the dispenser, it is desirable to provide means for agitating the material periodically thereby assuring proper delivery of the material to the measuring means.

SUMMARY OF THE INVENTION

The present invention comprehends an improved dispenser for particulate material, such as coffee, providing the above-discussed desirable functioning in a simple and novel manner.

More specifically, the invention comprehends the provision of such a dispenser including a hopper for storing particulate material to be dispensed, the hopper defining a bottom opening for passing the material downwardly, means defining a plurality of receptacles subjacent the hopper opening, means for selectively concurrently positioning the receptacle in a first position to receive material from the hopper and in a second position to deliver the received material from the dispenser, and means for selectively blocking a preselected number of the receptacles in the first position to permit transfer of the material from the hopper only to the unblocked receptacle for delivery therefrom of a preselected quantity of the material.

The dispenser may further include means for agitating the particulate material in the hopper as an incident of moving the receptacles in one or both directions between the ingredient-receiving and ingredient-delivering positions.

The dispenser may be arranged to provide a minimum preselected quantity and preselected additional quantities as desired.

The dispenser is extremely simple and economical of construction while yet providing improved accurate functioning as discussed above.

BRIEF DESCRIPTION OF THE DRAWING

Other features and advantages of the invention will be apparent from the following description taken in connection with the accompanying drawing wherein:

FIG. 5 is a fragmentary enlarged vertical section taken substantially along the line 5—5 of FIG. 1;

FIG. 6 is a fragmentary horizontal section taken substantially along the line 6—6 of FIG. 5;

FIG. 7 is a side elevation of a measuring chamber element for use therein;

FIG. 8 is a fragmentary enlarged vertical section illustrating the arrangement of the retaining elements for permitting withdrawal of the blocking elements; and FIG. 9 is a fragmentary vertical section illustrating the arrangement of the means for mounting the measuring chamber walls in the dispenser.

DESCRIPTION OF THE PREFERRED EMBODIMENT

Figure 1:
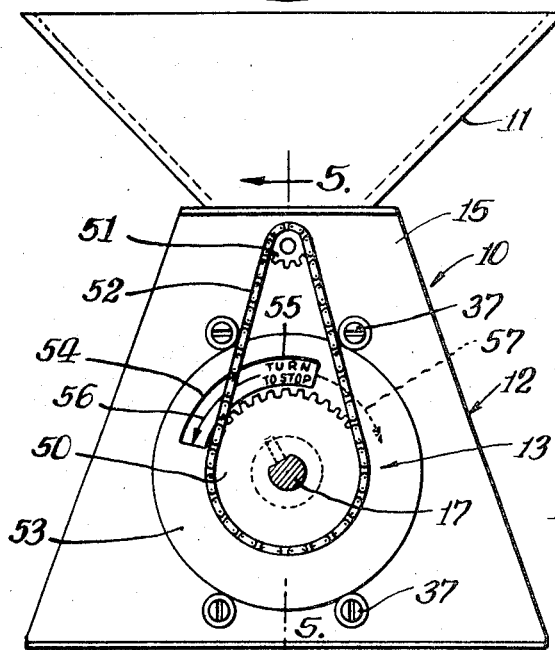
FIG. 1 is a front elevation of a dispenser for particulate material embodying the invention.

In the exemplary embodiment of the invention as disclosed in the drawing, a dispenser generally designated 10 for dispensing particulate, or pulverulent, material, such as ground coffee, is shown to comprise a hopper 11 and a measuring means 12 subjacent the hopper for delivering preselected quantities of the particular material from the hopper as desired. The dispenser includes manually operable means generally designated 13 for effecting the delivery of the preselected quantities and further includes means generally designated 14 for agitating the material in hopper 11 as an incident of operation of the dispenser.

Figure 2:
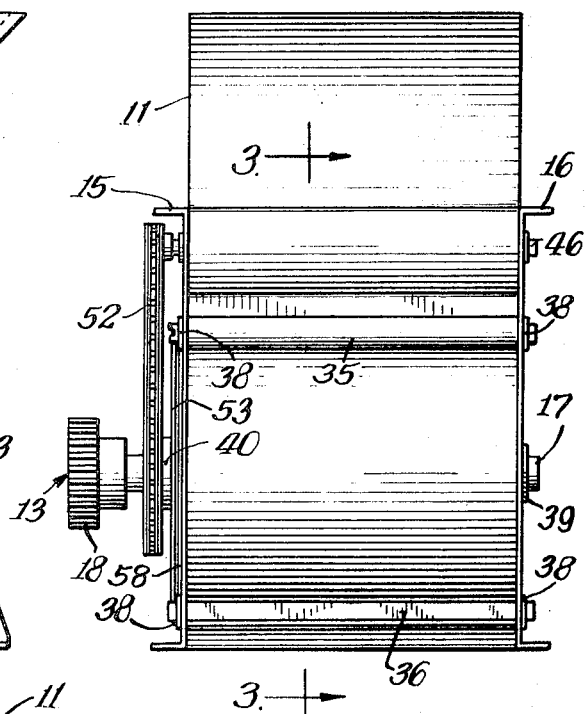
FIG. 2 is a side elevation thereof.

As shown in FIGS. 1 and 2, the dispenser includes a front mounting plate 15 and a rear mounting plate 16 journalling a shaft 17 adapted to be manually rotated by means of knob 18.

Figure 3:
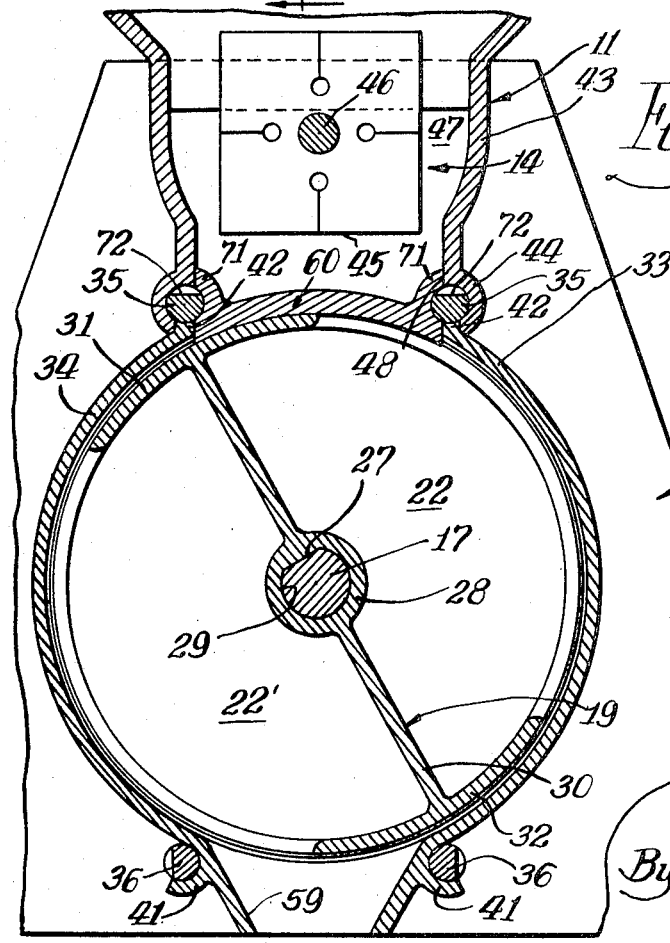
FIG. 3 is a fragmentary enlarged vertical section taken substantially along the line 3—3 of FIG. 2.
Figure 4:
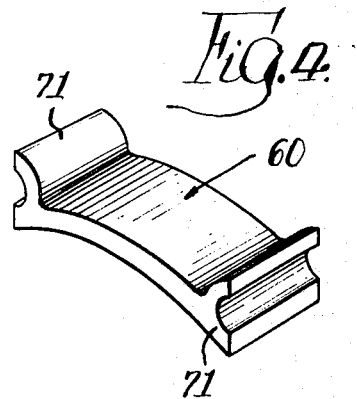
FIG. 4 is a perspective view of a blocking element for use therein.

Measuring means 12 includes a plurality of elements 19 mounted on shaft 17 and cooperatively defining a plurality of receptacles 20, 21, 22, 23, 24, 25, and 26 of different volumetric capacities. As shown in FIG. 3, shaft 17 is provided with a flat 27 and elements 19 are provides with hubs 28 having a corresponding flatted cross-section bore 29 for mounting of the elements on the shaft for rotation therewith. Each of receptacles 20–26 includes a diametric wall 30 and a pair of arcuate shutters 31 and 32 carried at opposite ends of wall 30. The measuring means further defines a pair of segmentally cylindrical outer walls 33 and 34 concentric to the path of movement of shutters 31 and 32. As best seen in FIGS. 1 and 3, walls 33 and 34 are retained between end plates 15 and 16 by means of upper retaining rods 35 and lower retaining rods 36 rotatably mounted in the end plates and having slotted ends 37 exposed at the front of front plate 15 for rotational adjustment of the rods. The rods may be retained in place against axial displacement by suitable retaining washers 38. Similarly, shaft 17 may be retained against axial displacement in the end plates 15 and 16 by a retaining washer 39 and a collar 40. Cylindrical wall elements 33 and 34 are provided with lowermost arcuate retainer portions 41 for cooperation with lower rods 36, and upper flanges 42 for cooperation with upper rods 35 in retaining the walls 33 and 34 in the measuring chamber arrangement of FIG. 3.

Hopper 11 includes a lower connection portion 43 having arcuate connecting portions 44 at the lower end for selective retention by upper rods 35. Connecting portions 44 further cooperate with flanges 42 of the measuring chamber side walls 33 and 34 for retaining the upper ends of the side walls in position as shown in FIG. 3. Further as shown in FIG. 3, agitator 14 includes a plurality of square blades 45 carried on a shaft 46 extending through a space 47 within hopper lower portion 43. The lower portion of the hopper defines a bottom opening 48 downwardly through which the particulate material is delivered to measuring means 12. The width of the opening 48 is made to be greater than the side dimension of the square agitator blades 45 so that the hopper may be removed by relative movement of the blades 45 through the opening 48 when desired.

As shown in FIG. 5, blades 45 are twisted out of the flat plane to provide improved agitator functioning. Shaft 46 is rotatably journalled in end plates 15 and 16 and retained against axial movement therein by suitable lock washers 49.

As shown in FIGS. 1 and 2, shaft 17 carries forwardly of front plate 15 a sprocket 50. The forward end of the shaft 46 carries a small sprocket 51 for rotation from sprocket 50 by means of a suitable chain 52 whereby agitator 14 is operated as an incident of rotation of shaft 17 in effecting the delivery of the measured quantity of particulate material from the dispenser. As shown, sprocket 51 is substantially smaller than sprocket 50 so that the agitator blades are rotated at least twice as rapidly as the shaft 17 for improved agitation of the particulate material in hopper portion 47.

Shaft 17 further carries a dial plate 53 having an arcuate opening 54 therein exposing a legend 55 "Turn To Stop," and a pair of arrows 56 and 57 showing the opposite directions of rotation from legend 55. The shaft is rotatable approximately 300° from the position shown in FIG. 1 in a counterclockwise direction until arrow 57 and legend 55 are exposed with arrow 57 being covered at the extreme of the counterclockwise movement. Alternatively, the shaft is rotatable 300° in a clockwise direction from the position wherein legend 55 and arrow 57 are exposed through slot 54 to the full line position of FIG. 1. A stop bracket 58 is provided for limiting the rotation as indicated. The position of receptacles 20–26 is thusly alternated from an upwardly opening position for received particulate material delivered downwardly through hopper bottom opening 48, and a downwardly opening position wherein the material in the receptacles is delivered downwardly through an outlet chute 59 defining the lower end of cylinder walls 33 and 34. At the same time that the receptacles 20–26 are disposed in the downwardly opening direction, an opposite set of corresponding receptacles 20', 21', 22', 23', 24', 25', 26' is disposed to open upwardly for receiving a further quantity of the particulate material delivered through the hopper opening 48.

Thus, alternate rotation of measuring means 12 selectively causes filling of receptacles 20–26 with concurrent dumping of the particulate material from corresponding receptacles 20'–26' and subsequent filling of receptacles 20'–26' with concurrent dumping of the particulate material from the previously filled receptacles 20–26 at the opposite extremes of movement of the measuring device 12. As shown in FIG. 3, the receptacle device is in an intermediate position wherein the bottom opening 48 of the hopper is partially closed as during movement of the measuring device receptacles between their respective extreme positions.

As indicated briefly above, the measuring means is arranged to provide for delivery of different preselected quantities of particulate material upon each operation of the device. Thus, as best seen in FIG. 5, the dispenser includes blocking means generally designated 60 for selectively blocking different ones of the receptacles and thereby correspondingly changing the total quantity of particulate material dispensed during each operation of measuring means 12. As shown in FIG. 5, the blocking means comprises a plurality of block elements 61, 62, 63, 64, 65, blocking receptacles 21(21'), 22(22'), 23(23'), 24(24') and 25(25''). Thus, when each of the block elements 61–65 is installed, only receptacles 20 and 26 (20' and 26') are filled from hopper 11 thereby providing a minimum preselected quantity of particulate material during each operation of the measuring device. Illustratively, receptacles 20, 21, 24 and 26 may have a capacity of ½ oz; receptacle 22 may have a capacity of 1 oz.; and receptacles 23 and 25 may have a capacity of ¾ oz. Thus, with each of the blocking element 61–65 installed, a total quantity of 1 ounce of particulate material will be delivered during each operation of the measuring device. To obtain additional quantities, the user need merely unblock different receptacles by removing the blocking element thereover and permitting that receptacle to be filled during the operation of the measuring device. Thus, illustratively, if the user wishes to deliver 2-¾ ounces of particulate material during the operation of the device, he would remove block element 62 and block element 65 thereby additionally exposing receptacles 22 and 25 having a volumetric capacity of 1 ounce and three-fourths ounce, respectively. It should be noted that by virtue of the indicated different volumetric capacities, changes in the delivered volume may be varied by increments of one-fourth ounce betweeen the total delivery volumes of 1-½ to 4-½ ounces. As will be obvious to those skilled in the art, the receptacles 20–26 may be made to have other suitable capacities and any suitable number of different receptacles may be provided as desired within the scope of the invention.

More specifically, as seen in FIG. 7, the receptacles are defined by a plurality of double ended, cup-shaped elements generally designated 66. Thus, each receptacle element comprises a circular transverse wall 67 defining one end of the receptacle spaces at the opposite sides thereof. Wall 67 carries, at diametrically opposite portions thereof, the arcuate shutters 31 and 32 and carries hub 28 at its center with dividing wall 30 extending diametrically from hub 28 the full axial width of the receptacle element. Transverse wall 67 is axially asymmetrically positioned so as to define a pair of ½ ounce spaces 68 and 68' at one side of the wall and ¼ ounce spaces 69 and 69' at the other side of the wall. Thus depending on the side-by-side relationship of the paired receptacle elements, the total capacity of the resultant receptacle spaces 20–26 varies from ½ ounce where two ¼ cunce spaces 69 are in confrontation, to ½ ounce where one ¼ ounce space 69 and a ½ ounce space 68 are in confrontation, and to 1 ounce where two ½ ounce spaces 68 are in confrontation.

Each receptacle element is provided with an outwardly projecting flange 70 for locking the blocking elements against axial displacement from the position shown in FIG. 5. As shown in FIG. 3, the blocking elements 60 are retained across hopper bottom opening 48 by means of arcuate flanges 71 receiving upper retaining rods 35. To install or remove the blocking means 60, the rods are turned to the position of FIG. 8 wherein a flatted portion 72 thereof is turned toward the blocking element thereby to permit the arcuate flange portion 71 to be free of the rod for installation or removal of the blocking element as desired.

If it is desired to remove hopper 11 from the dispenser, the rods are rotated 180° from the position of FIG. 8 thereby to dispose the flatted portions outwardly to provide clearance therefrom by the lower inturned end 73 of the arcuate connecting portions 44 of the hopper. Such removal of the hopper further permits removal of the cylinder walls 33 and 34 by virtue of the release of the upstanding flanges 42. Thus, as shown in FIG. 3, when the flatted portions 72 are turned uppermost in the hopper, cylinder walls and blocking elements are cooperatively fixed in the dispenser. By simple manipulation of the rods 37, the dispenser parts may be readily disassembled as for cleaning and replacement.

Operation of dispenser 10 is extremely simple. The user need merely fill hopper 11 with the particulate beverage ingredient, such as ground coffee, with the discharge chute 59 disposed in an elevated position for delivering measured quantities of the ground coffee to a receiver, such as a brewing cartridge (not shown). The user then merely rotates the measuring device 12 300° to transfer ground coffee previously delivered into the upwardly opening measuring receptacles downwardly through chute 59 into the cartridge. At the same time, the counterpart receptacles are positioned upwardly to receive the next quantity of ground coffee. Thus, the next delivery of the measured quantity is effected by the user merely reversely rotating the measuring device 300° to the opposite limit of movement. Thus, each time the device delivers a preselected quantity of material, it concurrently refills the measuring chambers potentiating the device for a subsequent delivery.

Rotation of the measuring device further automatically effects agitation of the particulate material in hopper 11 by the concurrent rotation of agitator blades 45 thereby assuring a complete filling of the exposed measuring chambers 20-26. The total quantity of particulate material dispensed during each operation of the dispenser is readily varied by suitable selection of the desired blocking elements 61-65 for covering one or more of the measuring chambers 21-25.

Dispenser 10 is extremely simple and economical of construction with an effectively minimum number of moving parts while yet providing high flexibility in the control of the preselected quantity of particulate material to be dispensed. The device may be formed economically of molded plastic and formed sheet metal for further effectively minimizing cost while yet providing a long life, trouble-free dispensing means.

The foregoing disclosure of specific embodiments is illustrative of the broad inventive concepts comprehended by the invention.

I claim:
1. A particulate material dispenser comprising: a hopper for storing particulate material to be dispensed, said hopper defining a bottom opening for passing said material downwardly; means defining a plurality of receptacles subjacent said hopper opening each receptacle having an outer opening having a cross section smaller than that of the receptacle inwardly thereof; means for alternatively concurrently rotatively positioning said receptacles back-and-forth substantially greater than 180° between a first position wherein the receptacles receive material from said hopper to effectively fully fill the receptacles and a second position wherein said receptacles deliver the received material from the dispenser; and a plurality of blocking elements for selectively blocking a preselected number of said receptacles in said first position to permit transfer of said material from said hopper only to the unblocked receptacles for delivery therefrom of a preselected quantity of said material, each said blocking element being arranged to fully block one associated receptacle when disposed in a receptacle blocking disposition.

2. The particulate material dispenser of claim 1 wherein said preselected number includes zero.

3. The particulate material dispenser of claim 1 wherein said preselected number is at least one less than the number of said receptacles.

4. The particulate material dispenser of claim 1 including means for pivotally carrying said receptacles for pivotal movement between an upright first position and a down-turned second position.

5. The particulate material dispenser of claim 1 further including a second plurality of receptacles, and means for selectively concurrently positioning said receptacles of said second plurality in said second position when said receptacles of said first plurality are positioned in said first position, and positioning said receptacles of said second plurality in said first position when said receptacles of said first plurality are in said second position.

6. The particulate material dispenser of claim 1 wherein said receptacle defining means comprises a hollow cylinder having a tubular outer wall, a diametric cross-wall, and a plurality of radial walls dividing the hollow cylinder into a plurality of longitudinally related spaces defining said receptacles, said tubular outer wall being provided with openings to said spaces for transfer of said material therethrough from said hopper to said unblocked receptacles in said first position and delivery from said receptacles in said second position.

7. The particulate material dispenser of claim 1 wherein said receptacle defining means comprises a hollow cylinder having a tubular outer wall, a diametric cross-wall, and a first plurality of radial walls dividing one semi-cylindrical portion of the hollow cylinder into a plurality of longitudinally related first spaces defining said receptacles, said tubular outer wall being provided with openings to said spaces for transfer off said material therethrough from said hopper to said unblocked receptacles in said first position and delivery from said receptacles in said second position, and a second plurality of radial walls dividing the other semi-cylindrical portion of the hollow cylinders in a plurality of longitudinally related second spaces defining a second plurality of said receptacles, said tubular outer wall being further provided with openings to said second plurality of spaces for transfer of said material therethrough from said hopper to said unblocked receptacles in said first position and delivery from said receptacles in said second position.

8. The particulate material dispenser of claim 1 wherein each said blocking elements comprises a shutter element removably positioned across said bottom opening of the hopper.

9. The particulate material dispenser of claim 1 wherein said receptacles are of different sizes.

10. The particulate material dispenser of claim 1 further including a transfer chamber means housing said receptacles, said transfer chamber means defining a bottom opening for passing said material downwardly from the dispenser to effect said delivery.

11. The particulate material dispenser of claim 1 wherein said receptacle means further defines means for retaining said blocking elements in alignment with the preselected receptacles to assure said complete blocking of each blocked receptacle.

12. A particulate material dispenser comprising: a hopper for storing particulate material to be dispensed, said hopper defining a bottom opening for passing said material downwardly; means defining a plurality of receptacles subjacent said hopper opening; means for selectively concurrently positioning said receptacles in a first position to receive material from said hopper and in a second position to deliver the received material from the dispenser; means for selectively blocking a preselected number of said receptacles in said first position to permit transfer of said material from said hopper only to the unblocked receptacles for delivery therefrom of a preselected quantity of said material; and means for removably carrying the hopper, said selective blocking means and said removable carrying means including a rotatable asymmetric rod and cooperating shoulders on said carrying means and blocking means for selective engagement with said rod.

13. A particulate material dispenser comprising: a hopper for storing particulate material to be dispensed, said hopper defining a bottom opening for passing said material downwardly; means defining a plurality of receptacles subjacent said hopper opening each receptacle having an outer opening having a cross section smaller than that of the receptacle inwardly thereof; means for alternatively concurrently rotatively positioning said receptacles back-and-forth substantially greater than 180° between a first position wherein the receptacles receive material from said hopper to effectively fully fill the receptacles and a second position wherein said receptacles deliver the received material from the dispenser; a plurality of blocking elements for selectively blocking a preselected number of said receptacles in said first position to permit transfer of said material from said hopper only to the unblocked receptacles for delivery therefrom of a preselected quantity of said material, each said blocking element being arranged to fully block one associated receptacle when disposed in a receptacle blocking disposition; and means for agitating the particulate material in said hopper as an incident of moving said receptacle between said positions.

14. The particulate material dispenser of claim 13 wherein said positioning means comprises means for pivotally reciprocating said receptacles about a fixed axis and said agitating means is rotatable, and further including drive means interconnecting said receptacle rotating means and said means for agitating said particulate material in said hopper.

15. The particulate material dispenser of claim 14 wherein said drive means includes speed change means arranged to cause said agitating means to be rotated faster than said positioning means.

16. The particulate material dispenser of claim 13 further including means for removably carrying the hopper in the dispenser, said agitating means being arranged to pass through said bottom opening of the hopper to permit removal of the hopper from said dispenser with said agitating means retained in association with the dispenser.

17. The particulate material dispenser of claim 13 further including a transfer chamber means housing said receptacles, said transfer chamber means defining a bottom opening for passing said material downwardly from the dispenser to effect said delivery.

* * * * *